Patented Dec. 26, 1922.

1,440,056

UNITED STATES PATENT OFFICE.

FULLER CLARKSON AND JOSEPH M. BRAHAM, OF WASHINGTON, DISTRICT OF COLUMBIA.

METHOD OF MAKING UREA PHOSPHATE.

No Drawing. Application filed June 28, 1921. Serial No. 481,085.

*To all whom it may concern:*

Be it known that we, FULLER CLARKSON and JOSEPH M. BRAHAM, citizens of the United States, and residents of Washington, District of Columbia, have invented an Improvement in Methods of Making Urea Phosphate, of which the following is a specification.

The subject of this invention is method of making urea phosphate.

The main object of the invention is the provision of a simple, cheap and efficient method or process for making urea phosphate which will give comparatively high yields.

The invention relates to certain new and useful improvements in the process of making urea phosphate from urea and phosphoric acid. Urea phosphate consists of urea and phosphoric acid in equi-molecular proportions and is formed substantially in accordance with the following chemical equation:

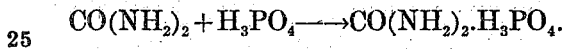

The product contains 21.5% ammonia and 44.9 phosphorus pentoxide, a ratio of ammonia to phosphorus pentoxide of 1 to 2.1, which is a very highly desirable ratio for fertilizing materials. It is known that urea phosphate is readily absorbed and assimilated by plants and that it produces no deleterious effect upon them. Urea phosphate can be used alone or mixed with other prepared fertilizer materials and it has the further advantages of being readily soluble in water and relatively non-hygroscopic, absorbing water to the extent of only 0.54% of its original weight in three weeks while subjected to an atmosphere of 80% relative humidity at 30° C. Although it is obvious that urea phosphate is excellently suited as a fertilizer material, it can also be used for many other purposes to which such a compound is applicable.

In order that this invention may be more clearly understood the following is submitted.

We are familiar with the German Patent No. 286,491, for treating phosphoric acid with urea. The process as disclosed in said patent comprises adding to about a 50% solution of phosphoric acid the corresponding amount of urea, (such amount of urea that the ratio of urea to phosphoric acid will be equi-molecular) heating until all the urea has gone into solution, filtering, and cooling to effect crystallization.

In our study of the formation of urea phosphate the procedure as outlined in the above mentioned German patent was first carried out. We added to 100 grams of 50% solution by weight of phosphoric acid ($H_3PO_4$) containing 0.51 mols. of phosphoric acid, 30.6 grams of urea (0.51 molecules) heated to 80° C. and cooled to 2° C. No solid phase appeared at this temperature even after considerable scratching of the vessel with a glass rod to induce crystallization.

While experiments carried out as above set forth gave no yield of urea phosphate, it was found that by "seeding," that is, adding a few crystals of urea phosphate to the solution to induce crystallization, some urea phosphate would crystallize out, giving a yield of 31%.

To exclude the possibility of insufficient urea to effect a separation of the salt from the solution, urea was added in 15.3 gram portions (0.25 molecules) with alternate heating and cooling until finally a total of 107.1 grams (1.75 mols.) has been added. On cooling to 2° C. about 5 grams of solid had crystallized out which on analysis was shown to be almost pure urea with only a trace of phosphoric acid. It is evident then that urea phosphate can not be made in accordance with the process described in said German patent.

Our next experiment consisted in adding 114 grams of urea to 159 grams of a solution of 63% phosphoric acid (approximately 2 mols, of urea to 1 mol. of phosphoric acid) and then heating to 80° C. to effect complete solution. On cooling this solution to about 20° C., 80 grams of solid were separated which was shown by the following analysis to be urea phosphate.

*Composition of urea phosphate.*

|  | Theoretical. | Found. |
|---|---|---|
| Urea nitrogen phosphorus | 17.71% | 17.65% |
| Pentoxide | 44.94% | 43.83% |

This last experiment was then repeated with substantially the same results. It is therefore seen that it is the acid concentration rather than the urea concentration that effects the separation of urea phosphate.

Experiments were then made using phosphoric acid concentrations of 55, 70, 77.5 and 85% acid, in which the molal ratio of acid to urea was varied from 0.5 to 1.0. With the 85% acid and a molal ratio of acid to urea of 1.0, 99.5% of the theoretical yield of urea phosphate was obtained on cooling the solution of 16° C. The yields decreased with decrease in said concentrations but were above 50% in all these experiments.

These experiments clearly show that an acid concentration considerably above 50% is desirable and further that the exact ratio of concentration of acid and urea in solution is not of great importance.

We prefer to carry out our process in the following manner:

To a solution of phosphoric acid having a concentration of about 75% is added urea in such an amount that there is present about one mol. of urea to one mol. of phosphoric acid. If desired the urea may be added in the form of its solution. In any case the concentration conditions should be substantially as described above.

Having obtained a solution by the method outlined above, the crystals of urea phosphate may be separated from the solution in a dry state by any of the well known methods employed for such a purpose. Due to the fact that urea phosphate has a marked tendency to form a super-saturated solution it may in some cases be advisable to induce or hasten crystallization by inoculating with crystals of urea phosphate. It is understood, of course, that the mother liquor obtained in this process may be used over and over again. It is desirable, however, to carry out the process in such a manner that the evaporation required shall be a minimum due to the fact that urea in phosphoric acid solution undergoes decomposition, the rate of decomposition increasing rapidly with temperature especially above 90° C. However, this decomposition will in general involve no loss of ammonia, due to the formation of ammonium phosphate.

Although we have set forth in considerable detail the manner in which we prefer to carry out our process we do not wish to be limited to the exact conditions herein described but desire to include such changes therein as may appear to those skilled in the art and which fall within the spirit and scope of the claims.

What we claim as new and desire to secure by Letters Patent, is:

1. The process of making urea phosphate, comprising bringing together a solution of phosphoric acid of a concentration of at least 55% by weight of the compound $H_3PO_4$ and urea in such proportions that there is present substantially one mol. of urea to one mol. of phosphoric acid.

2. The process of making urea phosphate, comprising bringing together a solution of phosphoric acid of a concentration of at least 55% by weight of the compound $H_3PO_4$ and a solution of urea, in such proportions that there is present about one mol. of phosphoric acid to one mol. of urea.

3. The process of making urea phosphate, comprising bringing together phosphoric acid in a fluid state and a solution of urea in such proportions that the concentration will be at least 55% by weight of the compound $H_3PO_4$ and there will be present about one mol. of phosphoric acid to one mol. of urea.

4. The process of making urea phosphate, comprising bringing together the mother liquor from which solid urea phosphate has been separated with urea and phosphoric acid in such amounts and proportions that there is a concentration of at least 55% by weight of phosphoric acid and there is present about one mol. of urea to one mol. of phosphoric acid.

5. The process of making urea phosphate, comprising bringing together the mother liquor from which solid urea phosphate has been separated with urea in such amounts and proportions that there is a concentration of at least 55% by weight of phosphoric acid and there is present about one mol. of urea to one mol. of phosphoric acid.

6. The process of making urea phosphate comprising bringing together the mother liquor from which solid urea phosphate has been separated with phosphoric acid in such amounts and proportions that there is a concentration of at least 55% by weight of phosphoric acid and there is present about one mol. of urea to one mol. of phosphoric acid.

FULLER CLARKSON.
JOSEPH M. BRAHAM.